United States Patent [19]

Arahara et al.

[11] Patent Number: 4,789,617

[45] Date of Patent: Dec. 6, 1988

[54] PRODUCTION OF TONER THROUGH POLYMERIZATION

[75] Inventors: Kozo Arahara; Toshikazu Ohnishi, both of Tokyo; Hiroshi Fukumoto, Kawasaki, all of Japan

[73] Assignee: Canon Kabushiki Kaisha, Tokyo, Japan

[21] Appl. No.: 947,094

[22] Filed: Dec. 29, 1986

[30] Foreign Application Priority Data

Dec. 28, 1985 [JP] Japan ................................ 60-298821
Feb. 6, 1986 [JP] Japan ................................ 61-024651

[51] Int. Cl.$^4$ .......................... G03G 9/08; C08F 2/00
[52] U.S. Cl. .................................. 430/137; 563/333; 524/458; 565/316; 526/73; 526/201
[58] Field of Search ............... 430/137; 526/73, 201; 525/316; 524/458; 523/333

[56] References Cited

U.S. PATENT DOCUMENTS

| 2,985,638 | 5/1961 | Trotter | 526/73 |
| 3,661,867 | 5/1972 | Koyanagi et al. | 526/73 |
| 3,701,761 | 10/1972 | Ashina et al. | 526/73 X |
| 3,957,744 | 5/1976 | Denschel et al. | 526/73 |
| 4,265,994 | 5/1981 | Hasegawa et al. | 430/110 X |
| 4,592,990 | 6/1986 | Takagi | 430/137 |
| 4,601,968 | 7/1986 | Hyosu | 430/137 |
| 4,609,607 | 9/1986 | Takagi | 430/106.6 |
| 4,656,113 | 9/1987 | Ohshima et al. | 430/137 |

FOREIGN PATENT DOCUMENTS

| 57-158848 | 9/1982 | Japan | 430/137 |
| 59-123851 | 7/1984 | Japan | 430/137 |
| 59-152453 | 8/1984 | Japan | 430/137 |

*Primary Examiner*—Roland E. Martin
*Attorney, Agent, or Firm*—Fitzpatrick, Cella, Harper & Scinto

[57] ABSTRACT

A toner suitable for developing electrostatic images is produced through a process comprising: dispersing a monomer composition comprising at least a polymerizable monomer and a colorant in an aqueous medium heated at a temperature higher than a polymerization temperature, thereby to form particles of the monomer composition; adjusting the aqueous medium to the polymerization temperature; and adding a substantially water-insoluble polymerization initiator to the aqueous medium containing the particles of the monomer composition dispersed therein and adjusted to the polymerization temperature, thereby to cause the polymerization of the polymerizable monomer. According to this process, a toner containing a large amount of a low-softening point compound and having good fixability at low pressure and/or low temperature can be produced while retaining good anti-blocking characteristic and fluidity.

22 Claims, 1 Drawing Sheet

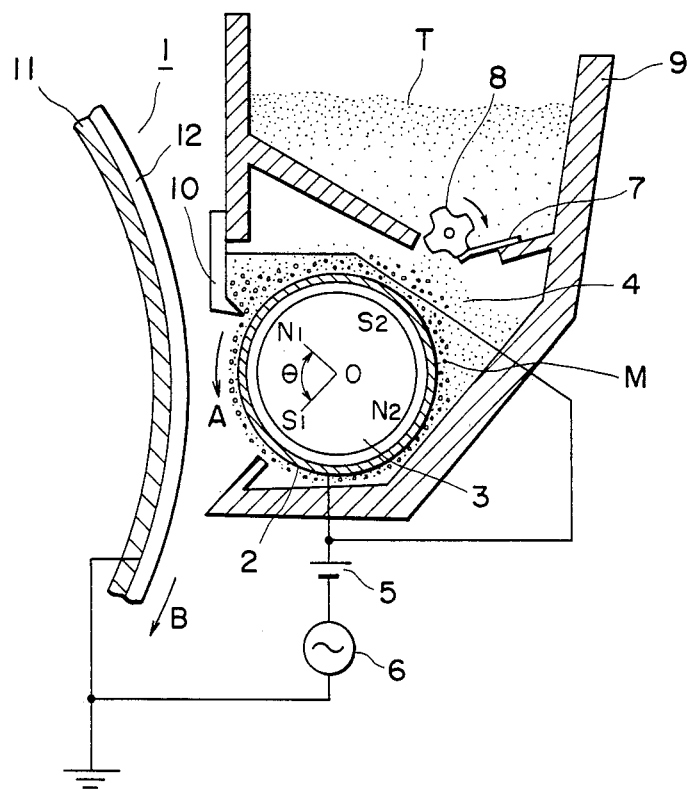

PRODUCTION OF TONER THROUGH POLYMERIZATION

FIELD OF THE INVENTION AND RELATED ART

The present invention relates to a process for producing a toner from a monomer composition through suspension polymerization and a toner thus produced (hereinafter sometimes referred to as "polymerization toner") for developing electrostatic images.

Conventionally, toners for development of electrostatic charges have been manufactured by fusion-mixing colorants and other additives into thermoplastic resins to be dispersed uniformly therein, followed by pulverization and classification into desired particle sizes by means of a micropulverizer and a classifier. This preparation method is capable of producing excellent toners but is accompanied with potential problems arising from the pulverization step. As for a toner produced through the pulverization process, the material therefor is required to be sufficiently fragile so as to be readily pulverized to some extent. However, too fragile a material is pulverized beyond a resonable extent, so that separation of a fine powder portion is necessitated in order to obtain a toner with an appropriate particle size distribution, whereby there results in an increase in production cost. Further, the toner can be additionally pulverized in a developing apparatus of a copying machine in some cases. Also, in a case where a low-melting point material is used in order to improve a heat fixability or a pressure-fixable material is used, an agglomeration phenomenon can occur in a pulverizer or classifier, thus precluding continuous production in some cases.

There are other requisite conditions for a toner such that it has a triboelectric charging characteristic suitable for development, that it provides excellent images, that it has no change in property when left standing, that it causes no coagulation (blocking), that it has an appropriate characteristic for heat, heat-pressure or pressure fixation, and that it causes no staining on the surface of a photosensitive member. Especially in respect of fixation, an offset phenomenon wherein toner sticks onto a fixing roller and is then re-transferred onto a subsequently coming sheet of paper, has been a problem. In order to prevent such phenomenon, application of a release agent such as silicone oil has been practiced. In recent years, however, there has been used a method wherein the offset is prevented by incorporating a polyolefin such as polypropylene or polyethylene in a toner and no or only a reduced amount of release agent is applied on a fixing roller. However, this method still involves a problem for exhibiting a sufficient offset prevention effect for a long period. When a larger amount of a polyolefin is added or a polyolefin with a lower melting point is used in order to improve the anti-offset property for this reason, there arises, for example, a problem that melt sticking occurs in a pulverizer or a classifier, so that it has been difficult to practically adopt measures in the pulverization process.

Therefore, in order to overcome the problems of the pulverization process, it has been proposed to directly produce a toner though suspension polymerization.

In the suspension polymerization process proposed heretofore, a monomer composition comprising at least a colorant, a polymerizable monomer and a polymerization initiator is formed into particles of toner particle sizes, and the polymerization monomer is polymerized to form a polymer with radicals generated by decomposition of the polymerization initiator on heating, whereby a polymerization toner is produced. This process has charactistics that no pulverization step is involved so that the material therefor is not required to be fragile, and that the resultant toner has a spherical shape so that it is excellent in fluidity and has a uniform triboelectric chargeability. In recent years, as a further improvement in image quality of copied images, a higher copying speed and a less energy consumption for copying are desired, so that a toner having a further improved developing characteristic and capable of providing good fixed images through fixation at a lower temperature or a lower pressure while not deteriorating anti-blocking characteristic, fluidity or abrasion resistance, and an efficient process for producing such a toner, are expected to be developed.

In order to improve the developing characteristics of a toner, it is known to make the particle size distribution of a toner precise, or "sharp". As a measure for obtaining a sharp particle size distribution in the suspension polymerization process, there is a method of making the particle formation easier by lowering the viscosity of a monomer composition in a high temperature aqueous medium. When the amounts of various additives other than the polymerizable monomer are increased, the necessity of raising the temperature of the monomer composition to lower the viscosity thereof is strengthened. In the conventional suspension polymerization process, however, the polymerization initiator is already present in the monomer composition in the particle formation step, so that the polymerization initiator is decomposed too vigorously and lost rapidly when the system is brought to a higher temperature (e.g., about 80° C.) than a temperature (e.g., about 50°–60° C.) at which the polymerization initiator is decomposed to produce radicals in the particle formation step, so that the polymerization of the polymerizable monomer does not proceed well.

As another method for providing a sharp particle size distribution, there is a method of classifying a polymerization toner after the completion of the suspension polymerization. In the pulverization process for toner production, it has been possible to re-use a coarse toner fraction and an ultra fine particle fraction outside a prescribed range by mixing then with the starting material for recycling to the melt-kneading step. In the suspension process, however, it is difficult to reuse a coarse or an ultra fine toner fraction separated by classification, e.g., by mixing it with the monomer composition, so that the provision of a classification step has provided a serious problem in view of the yield. Accordingly, there is expected a polymerization toner production process wherein substantially no classification step is necessary or wherein a coarse particle fraction separated by classification can be re-used.

Further, in a case where a low-softening point component such as solid paraffin or a low-molecular weight polyolefin having a shape-retaining characteristic is added in a large amount to the monomer composition for the purpose of lowering the temperature or pressure for fixation of a polymerization toner, a polymerizable monomer and such a low-softening point material have poor mutual solubility and it is difficult to effect uniform dispersion, so that it has been necessary to form particles of the monomer composition in an aqueous medium at a higher temperature than usual.

In a conventional suspension polymerization process, however, a polymerization initiator is already present at the step of particle formation as described above, so that there is a limit in raising the temperature of the aqueous medium and therefore the amount that a low-softening point compound can be added has been extremely restricted.

SUMMARY OF THE INVENTION

An object of the present invention is to provide a process for producing a polymerization toner which has solved the problems involved in the prior art process for producing a suspension polymerization toner as described above.

A specific object of the present invention is to provide a process for producing a polymerization toner which is spherical to exhibit good fluidity and has a sharp particle size distribution.

Another object pof the present invention is to provide a process for producing a polymerization toner having a prescribed particle size distribution at a good yield.

A further object of the present invention is to provide a process for producing a polymerization toner which is fixable at a low temperature and a low pressure which is adapted for fixation with minimum energy consumption or for use in a high speed copying machine.

Another object of the present invention is to provide a polymerization toner which solves the problems involved in the conventional pulverization process.

A further object of the present invention is to provide a polymerization toner which is fixable at a low temperature and a low pressure and adapted for fixation with minimum energy consumption or for use in a high speed copying machine.

A still further object of the present invention is to provide a polymerization toner which contains a low-softening point compound in a larger amount than in the polymerization toner of the prior art.

A further object of the present invention is to provide a polymerization toner which is spherical to be good in fluidity, is excellent in anti-blocking property, has a sharp particle size distribution and contains a large amount of a low-softening point compound.

A further object of the present invention is to provide a polymerization toner containing a large amount of a low-softening point compound which has excellent durability and has less depending on fixation speed.

According to a first aspect of the present invention, there is provided a process for producing a polymerization toner through suspension polymerization characterized in that monomer composition comprising at least a polymerizable monomer and a colorant in an aqueous medium heated at a temperature higher than a polymerization temperature to form particles of the monomer composition, and adding a substantially water-insoluble polymerization initiator to the aqueous medium containing the particles of the monomer composition dispersed therein and adjusted to the polymerization temperature, thereby to effect the suspension polymerization of the polymerizable monomer.

According to a second aspect of the present invention, there is provided a polymerization toner which has been obtained from a monomer composition comprising at least a polymerizable monomer and a colorant, the polymerization toner further containing a low-softening point compound having a softening point of 40°-130° C.
in an amount of 50–3000 wt. parts per 100 wt. parts of the polymer formed from the polymerizable monomer.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE in the attached drawing is a sectional view schematically showing a developing apparatus to which the polymerization toner according to the present invention is applicable.

DETAILED DESCRIPTION OF THE INVENTION

In the process of the present invention, a polymerization initiator for polymerizing a polymerizable monomer is added to an aqueous medium after a monomer commposition containing the polymerizable monomer has been formed into particles in the aqueous medium. For this reason, it is possible to form the particles of the monomer composition while keeping the temperature of the aqueous medium as a dispersion medium for the monomer composition at a high temperature. Further, it is also possible to separate monomer composition particles within a prescribed size range and monomer composition particles outside the prescribed size range by providing a classification step, and thereafter adding the polymerization initiator to effect the polymerization. On the other hand, it is possible to re-use the separated particles of the monomer composition having sizes outside of the classification range by mxing them with another part of the monomer composition before the polymerization step and again subjecting the mixture to dispersion for particle formation. As the temperature of the aqueous medium can be raised to a high temperature regardless of the decomposition temperature of the polymerization initiator during the particle formation step, even a low softening point compound such as paraffin or low-molecular weight polyolefin which is substantially insoluble in the polymerizable monomer can be added in a large amount to the monomer composition, and even in a case of adding a large amount, it is possible to effect particle formation at a high temperature to obtain a polymerization toner susceptible of fixation at a low temperature and/or a low pressure.

According to our knowledge, when a water-soluble initiator is used, the resultant polymerization toner is caused to have a low moisture resistance, and suffers from degradation in developing characteristic and anti-blocking property under high temperature-high humidity conditions. For this reason, in order to produce a polymerization toner with excellent environmental characteristics, it is necessary to use a substantially water-insoluble polymerization initiator. When a substantially water-insoluble polymerization initiator is used, it is expected that the initiator is evenly distributed to individual particles of a monomer composition in a conventional system where the intiator is dissolved in the monomer composition in advance. However, it is quite surprising that individual particles causes polymerization in an adequate manner, even in a system like that of the present invention wherein a monomer composition is formed into particles in an aqueous medium, and then a water-insoluble polymerization initiator is added thereto.

The polymerization initiator used in the present invention is hardly water-soluble or substantially water-insoluble. More specifically, the substantially water-insoluble polymerization initiator used in the present invention has a solubility of 1 g or less in 100 g of water, preferably 0.5 g or less in 100 g of water, particularly preferably 0.2 g or less in 100 g of water, respectively at room temperature. When the solubility is more than 1 g in 100 g of water, the decomposition product of the initiator remaining on the surfaces of the polymerization toner particles undesirably lowers the moisture resistance of the polymerization toner. The polymerization initiator used in the present invention is soluble in the polymerizable monomer and has a property of being well dissolved in the monomer in an ordinarily used range of amount (e.g., 2–5 wt. parts per 100 wt. parts of the monomer). Examples of the polymerization initiator usable in the present invention may include: azo- or diazo-type polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, etc.; and peroxide-type polymerization initiators such as benzoyl peroxide, methyl ethyl ketone peroxide, isopropyl peroxycarbonate, cumene hydroperoxide, 2,4-dichlorobenzoyl peroxide and lauroyl peroxide. In the production process of the present invention, it is preferred that the polymerization initiator has a melting point equal to or lower than the polymerization temperature (generally, 50° C. or above). It is also preferred to use a mixture of two or more polymerization initiators in order to control the molecular weight and molecular weight of the resultant polymer or in order to control the reaction time. In such a case, at least one of the initiators has a melting point equal to lower than a temperature corresponding to the temperature of the aqueous medium at the time of polymerization. This is because the polymerization initiator or radicals generated therefrom are better provided to individual particles of the monomer composition as the polymerization initiator is made into oil at the liquid temperature at the time of polymerization. For example, 2,2'-azobis-(2,4-dimethylvaleronitrile) used in Examples appearing hereinafter is a mixture of meso-isomer (m.p. 55°–57° C.) and dl-isomer (m.p. 74°–77° C.), and the mixture begins to melt at about 45° C. and completes the melting at about 70° C. The amount of use of polymerization initiator may be in the range of 0.1–20 wt. parts, preferably 1–10 wt. parts, per 100 wt. parts of the polymerizable monomer. Below 0.1 wt. part, it is difficult to provide the initiator evenly to individual monomer composition particles. Above 20 wt. parts is excessive since it provides too low a molecular weight of the polymerization product and increases the tendency that the polymerization occurs ununiformly.

The suspension polymerizaton is generally carried out at a polymerization temperature of 50° C. or higher, and the upper limit temperature may be set in consideration of the decomposition speed of the polymerization initiator. Too high a polymerization temperature is not desirable because the polymerization initiator decomposes too rapidly. In the present invention, as it is unnecessary to have a polymerization initiator be present in the monomer composition at the time of forming suspended particles, it is possible to effect the particle formation easily by increasing the temperature of the aqueous medium at the time of particle formation to, e.g., about 75° C. or above to decrease the melt viscosity of the monomer composition.

After it has been confirmed that the resultant particles of the monomer composition have a prescribed particle size, the temperature of the aqueous medium containing the particles to a polymerization temperature (e.g. 55°–70° C.), and then a polymerization initiator is added. By lowering the temperature of the aqueous medium, the shape-retaining property of the monomer composition particles is improved and coalescence between the particles is suppressed. The polymerization period is ordinarily 2–30 hours, while it can vary depending on the kind of the polymerization initiator and the polymerization temperature.

In the process of the present invention, as the particle formation may be effected at a high temperature, it is possible to incorporate a low-softening point compound in the monomer composition as an additive.

The polymerization toner according to the present invention may be used for developing electrostatic latent images, ordinarily has a volume-average particle size of about 0.1–about 30$\mu$, and contains a low-softening point compound having a softening point of 40°–130° C. in an amount of 50–3000 wt. parts per 100 wt. parts of the polymer formed from the polymerizable monomer through suspension polymerization. The polymerization toner of the present invention is excellent in anti-blocking property in spite of the fact that it contains a larger amount of a low-softening point compound as compared to the conventional polymerization toner. This is because the low-softening point compound is optionally enveloped by the polymer produced from the polymerizable monomer, and is not exposed to the surfaces of the polymerization toner particles. In the present invention, the confirmation as to whether the low-softening point compound is substantially enveloped by the polymer is effected by subjecting the resultant polymerization toner to melt-kneading, cooling to cause solidification, then crushing and classification to formulate crushed power having an average particle size which is substantially equal to that of the polymerization toner, and comparing the anti-blocking property of the crushed powder with that of the original polymerization toner. The anti-blocking property may be evaluated by placing 1–5 g of a sample in a 100 ml-container of about 5 cm in diameter, followed by standing for 1 day under the conditions of a temperature of 50° C. and a relative humidity of about 60±5%, then classifying the sample through a sieve of 20 mesh (Tyler) and observing whether or not agglomerated masses having a longitudinal size of about 1 mm or larger remains on the sieve.

In the present invention, it is possible to use a plurality of low-softening point compounds in mixture. In this case, the plurality (n) of low-softening point compounds should preferably satisfy the following condition:

$$0.05 < \frac{W1T1 + W2T2 + \ldots + Wn-1Tn-1 + WnTn}{(W1 + W2 + \ldots + Wn-1 + Wn)^2} < 0.8,$$

wherein the sets of a softening point (40°–130° C.) and an amount of the respective compounds are respectively denoted by (T1, W1), (T2, W2), . . . (Tn−1, Wn−1), (Tn, Wn).

The amount of the low-softening point compound is defined based on the assumption that the charged polymerizable monomer is polymerized at substantially 100% to form a polymer. Thus, in the above formula, the following condition is satisfied with respect to 100 wt. parts of the polymer:

$$50 \leq W1+W2+ \ldots Wn-1+Wn \leq 3000.$$

Thus, 100 parts of a polymer means 100 parts of a polymerizable monomer effectively used for providing the polymer. As a result, in view of an amount dissolved in the aqueous medium and an unreacted amount, it is possible that 100 wt. parts of a polymer is obtained by using more than 100 wt. parts of the polymerizable monomer.

When the above calculated value is between 0.05, the low-softening point material is excessive and the anti-blocking property is lowered and a tendency of insufficient mechanical strength is increased. On the contrary, if the above value exceeds 0.8, the degree of improvement in low-temperature fixability or low-pressure fixability is small.

The polymerization toner of the present invention may be produced according to the following process.

A monomer composition comprising at least a polymerizable monomer, a low-softening point compound having a low-softening point of 40°-130° C. and a colorant is dispersed to form particles in an aqueous medium heated to a high temperature, and after substantial completion of the particle formation, a polymerization initiator is added to the aqueous medium containing the monomer composition particles and having been adjusted to a polymerization temperature to effect suspension polymerization. In this case, it is preferred that the temperature of the aqueous medium at the time of particle formation is higher than the softening temperature of the low-softening point compound regarding ease of particle formation and sharp particle size distribution.

In the polymerization toner of the present invention, the low-softening point compound can also play the role of a binder resin. The low-softening point compound in the present invention has a softening point of 40°-130° C., preferably 50°-120° C., according to the ring and ball method (See JIS K2531, etc.). If the softening point is below 40° C., the anti-blocking property and shape-retaining property of the toner becomes insufficient. Above 130° C., the effect of lowering the pressure or temperature for fixation is small. Examples of the low softening point compound include paraffins, waxes, low-molecular weight polyolefins, modified waxes having aromatic group natural waxes, long-chain carboxylic acids having a long hydrocarbon chain (CH$_3$-(CH$_2$)$_{11}$ or -(CH$_2$)$_{12}$ or longer aliphatic chains) including 12 or more carbon atoms, and esters thereof. Different low-softening point compounds can be mixed. Examples of commercially available products include Paraffin Wax (Nihon Sekiyu K.K.), Paraffiin Wax (Nihon Seiro K.K.), Microwax (Nihon Sekiyu K.K.), Microcrystalline Wax (Nihon Seiro K.K.), Hard Paraffin Wax (Nihon Seiro K.K.), PE-130 (Hoechst), Mitsui Hi-Wax 110P (Mitsui Sekiyu Kagaku K.K.). Mitsui Hi-Wax 220P (ditto), Mitsui Hi-Wax 660P (ditto), Mitsui Hi-Wax 320P (ditto), Mitsui Hi-Wax 410P (ditto), Mitsui Hi-Wax 420P (ditto), Hiletz T-100X (ditto), Hiletz T-200X (ditto), Hiletz T-300X (ditto), Petrosin 80 (ditto), Petrosin 100 (ditto), Petrosin 120 (ditto), Tack Ace A-100 (ditto), Tack Ace F-100 (ditto), Tack Ace B-60 (ditto), Modified Wax JC-2130 (ditto), Modified Wax JC-4020 (ditto), Modified Wax JC-1142 (ditto), Modified Wax JC-5020 (ditto); bees wax, carnauba wax, and montan wax. In some cases, it is preferred that the temperature of the aqueous medium is raised to 100° C. or above under pressure to effect dispersion and particle formation when a low-softening point compound having a softening point of 100° C. or higher is used.

The above-mentioned low-softening point compound is added in an amount of 50-3000 wt. parts to 100 wt. parts of the polymerizable monomer in order to lower the temperature and pressure for fixation. It is particularly preferred to add 70-1000 wt. parts, further preferably 100-1000 wt. parts. An amount below 50 wt. parts is insufficient to lower the temperature and the pressure for fixation of fixing rollers. Above 3000 wt. parts, there arises an increase in tendency that the anti-blocking property and durability are lowered.

The polymerizable monomer applicable for production of the polymerization toner of the present invention may be those having a reactive double bond such as

or —CH=CH—. Examples thereof include: styrene and its derivatives such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; vinyl esters such as vinyl acetate, vinyl propionate, and vinyl benzoate; acrylic acid, methacrylic acid, maleic acid, maleic acid half esters; α-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, and phenyl methacrylate; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as vinyl methyl ether, vinyl ethyl ester, and vinyl isobutyl ether; vinyl ketones such as vinyl methyl ketone, vinyl hexyl ketone, and methyl isopropenyl, ketone; N-vinyl compounds such as N-vinylpyrrole, N-vinylcarbazole, N-vinylindole, and N-vinylpyrrolidone; vinylnaphthalenes; derivatives of acrylic acid and methacrylic acids such as acrylonitrile, methacrylonitrile, and acrylamide. These monomers may be used either singly or in mixtures of two or more species. A crosslinking agent may be used as desired. As the crosslinking agent, divinylbenzene, divinylnaphthalene, diethyl glycol dimethacrylate and ethylene glycol dimethacrylate are enumerated as examples. The crosslinking agent may generally be used in an amount of 0.1-5 wt. parts per 100 wt. parts of the polymerizable monomer. A polymer of such a polymerizable monomer can be added in a small amount into the monomer composition. A polymerization toner produced from styrene, styrene having a substituent such as an alkyl group, or a mixture of styrene and another monomer, is preferred when developing characteristic and durability are considered.

If a polar polymer (inclusive of copolymer) or cyclized rubber is added to a polymerizable monomer to be polymerized, a preferable polymerization toner having a pseudo-capsule structure can be obtained. The polar polymer or cyclic rubber may preferably be added in an amount of 0.5–50 wt. parts, preferably 1–40 wt. parts, per 100 wt. parts of the polymerizable monomer. Below 0.5 wt. part, it is difficult to obtain a desired pseudo capsule structure. Above 50 wt. parts, there arises an increased tendency that the characteristics of the polymerizable toner are lowered because the amount of the polymerizable monomer becomes insufficient. It is preferred that a polymerizable monomer composition containing the polar polymer or cyclized rubber thus added is suspended in an aqueous medium containing a dispersant dispersed therein having a chargeability to a polarity opposite to that of the polar polymer to be polymerized.

The cationic polymer (inclusive of copolymer), anionic polymer (inclusive or copolymer) or anionic cyclized rubber thus contained in the polymerizable monomer composition exerts an electrostatic force at the surface of toner-forming particles with the oppositely chargeable anionic or cationic dispersant dispersed in the aqueous medium, so that the dispersant covers the surface of the particles to prevent coalescence of the particles with each other and to stabilize the dispersion. In addition, as the added polar polymer or cyclized rubber gathers at the surface layer of the particles, a sort of shell is formed to provide the particles with a pseudo capsule structure. The polar polymer or cyclized rubber of a relatively large molecular weight thus gathered at the particle surfaces envelops a large amount of the low-softening point compound inside thereof to provide the polymerization toner particles of the present invention with excellent anti-blocking characteristic, developing characteristic and abrasion resistance. Examples of the polar polymer (inclusive of copolymer and cyclized rubber) and the oppositely chargeable dispersant may be raised hereinbelow. The polar polymer having a weight-average molecular weight of 5,000–500,000 as measured by GPC (gel permeation chromatography) is preferred because of good solubility in the polymerizable monomer and characteristic of providing a durable toner.

(a) Cationic polymers: polymers of nitrogen-containing monomers such as dimethylaminoethyl methacrylate and diethylaminoethyl acrylate; copolymers of styrene and such a nitrogen-containing monomers; and copolymers of styrene, an unsaturated carboxylic acid ester and such a nitrogen-containing monomer.

(b) Anionic polymers: polymers or copolymers of anionic monomers inclusive of nitrile monomers such as acrylonitrile, halogen-containing monomers such as vinyl chloride, unsaturated carboxylic acid such as acrylic acid, unsaturated dibasic acids, and unsaturated dibasic acid anhydrides; and coplymers of styrene and such an anionic monomer.

The dispersant may preferably be hardly water-soluble or substantially water-insoluble inorganic fine powder capable of stabilizing the dispersion of the monomer composition particles in an aqueous medium. The amount of addition of the dispersant may preferably be 0.1–50 wt. %, particularly 1–20 wt. %, based on the water.

(c) Anionic dispersant: colloidal silica such as Aerosil #200, #300 (Nihon Aerosil K.K.)

(d) Cationic dispersant: aluminum oxide, magnesium hydroxide and hydrophilic positively chargeable silica fine powder such as aminoalkyl-modified colloidal silica obtained through treatment with a coupling agent.

In order to produce a magnetic polymerization toner, magnetic particles are added into the monomer composition. In this case, the magnetic particles also function as a colorant. The magnetic particles comprise a substance magnetizable when placed in a magnetic field. Examples thereof may include powders of ferromagnetic metals such as iron, cobalt and nickel or alloys or compounds thereof such as magnetite, hematite and ferrite. Magnetic particles having a particle size of 0.05–5 $\mu$m, preferably 0.1–1 $\mu$m, may be used. The content of the magnetic particles may suitably be 10–60 wt. %, preferably 20–50 wt. %, based on the toner weight. It is possible that the magnetic particles have been treated with a treating agent such as silane coupling agent or titanate coupling agent or with an appropriate reactive resin. In this case, a treated amount of 5 wt. % or less, preferably 0.1–3 wt. %, may provide a sufficient dispersibility in the polymerizable monomer and low-softening compound while not exerting a bad influence on the toner properties.

The polymerization toner contains a colorant. The colorant may comprise known dyes or pigments such as carbon black or grafted carbon black obtained by coating the surface of carbon black with a resin. The colorant may be contained in a proportion of 0.5–30 wt. % based on the amount of the polymer and the low-softening point compound. It is possible to add a charge controller or a fluidity improver as desired into the toner (internal addition). Such a charge controller or a fluidity improver can also be mixed with the toner particles (external addition). The charge controller may for example be a metal complex of an organic compound having a carboxyl group or a nitrogen-containing group, a metal-containing dye, or a nigrosine. The fluidity improver or a cleaning aid for the surface of a latent image-bearing member (photosensitive member) may for example be colloidal silica or an aliphatic acid metal salt. It is also possible to incorporate a filler such as calcium carbonate or fine powdery silica in an amount of 0.5–20 wt. % in the toner for the purpose of extension. Further, it is possible to add a fluidity improver such as polytetrafluoroethyl fine powder or zinc stearate powder in order to disintegrate agglomerates of toner particles and improve their fluidity.

When a low-molecular weight hydrocarbon compound (e.g., weight-average molecular weight of 500–5000) or carnauba wax capable of improving the releasability at the time of hot roller fixing is used as a low-softening point compound, as they are hydrophobic and of low molecular weight, they are not readily mixed with the polymer formed during polymerization so that they are not readily exposed to the surface of the particle surfaces compared with the polar polymer or cyclized rubber but are pushed into the interior of the polymerization toner particles. As a result, even if a large amount of low-softening point compound is contained, the compound is enveloped so that excellent durability and anti-blocking property are retained. The compound is gushed out from the interior at the time of fixing to remarkably improve the fixability and the anti-offset characteristic. In other words, the low-softening compound serves as an anti-offset agent and a fixing agent.

In a case where the polymerization toner of the present invention is applied to a two-component developer, it may be mixed with a carrier in an ordinary mixing ratio, e.g., 1 wt. part of toner with 1–500 wt. parts of carrier.

In the dispersion or suspension step in the process according to the present invention, a monomer composition comprising a colorant (inclusive of a magnetic material), a polymerizable monomer and other optional additives in a uniformly dissolved or dispersed state is dispersed in an aqueous medium heated to a temperature which is 5° C. or more, preferably 10° C. or more, higher than a subsequent polymerization temperature and containing 0.1–50 wt. % of a suspension stabilizer (e.g., minimally water-soluble inorganic dispersant) under stirring by means of an ordinary stirrer or homomixer or homogenizer. Preferably, the speed and time for stirring and the temperature of the aqueous medium may be adjusted so that the droplets of the monomer composition have a desired toner particle size of 30 μm or below (e.g., 0.1–20 μm in terms of a volume-average particle size). After that, while stirring is effected to such an extent that the dispersion state is substantially maintained as such while preventing the sedimentation, the temperature of the aqueous medium is lowered to the polymerization temperature. The polymerization temperature may be set to a temperature of 50° C. or above, preferably 55°–80° C., particularly preferably 60°–75° C. While continuing the stirring, a substantially water-soluble polymerization initiator is added to the system to effect polymerization. After the completion of the reaction, the resultant toner particles are washed, recovered by an appropriate method such as filtration, decantation and/or centrifugation, and dried, thereby to obtain a polymerization toner. In the suspension polymerization, 200–3000 wt. parts of water is ordinarily used as an aqueous dispersion medium with respect to 100 wt. parts of the polymerizable monomer.

The dispersion of a monomer composition containing a large amount of low-softening point compound may be dispersed in the following manner. A monomer composition comprising a colorant (inclusive of magnetic material), 100 wt. parts of a polymerizable monomer, 50–3000 wt. parts of a low-softening compound and other optional additives in a uniformly dissolved or dispersed state is dispersed in an aqueous medium heated to a temperature which is, e.g., 5° C. or more, preferably 10° C.–30° C., higher than a subsequent polymerization temperature and containing 0.1–50 wt. % of a suspension stabilizer (e.g., minimally water-soluble inorganic dispersant) under stirring by means of an ordinary stirrer or homomixer or homogenizer. Preferably, the speed and time for stirring and the temperature of the aqueous medium may be adjusted so that the droplets of the monomer composition have a desired toner particle size of 30 μm or below (e.g., 0.1–20 μm in terms of a volume-average particle size). Thereafter, the polymerization is conducted in the same manner as described above.

It is possible to further add an appropriate dispersion stabilizer in the aqueous medium. Examples of such a dispersion stabilizer include polyvinyl alcohol, gelatin, methyl cellulose, methyl hydropropyl cellulose, ethyl cellulose, sodium carboxymethyl cellulose, polyacrylic acid and salts thereof, starch, gum alginic acid salts, zein, casein, tricalcium phosphate, talc, barium sulfate, bentonite, aluminum hydroxide, ferric hydroxide, titanium hydroxide and thorium hydroxide. One or more of these compounds may be added to the aqueous medium to such an extent that the process of the present invention is not adversely affected thereby.

In order to effect uniform dispersion of the inorganic dispersion stabilizer, it is possible to add a surfactant to the extent which will not adversely affecting the process of the present invention. The surfactant is used to promote the above mentioned dispersion stabilizer to show the prescribed function. Specific examples of such a surfactant include: sodium dodecylbenzenesulfonate, sodium tetradecylsulfate, sodium pentadecylsulfate, sodium octylsulfate, sodium allyl-alkyl-polyethersulfonate, sodium oleate, sodium laurate, sodium caprate, sodium caproate, potassium stearate, calcium oleate, sodium 3 3-disulfonediphenylurea-4,4-diazo-bis-amino-8-naphthol-6-sulfonate, ortho-carboxybenzene-azo-dimethylaniline, sodium 2,2,5,5-tetramethyl-triphenylmethane-4,4-diazo-bis-$\beta$-naphthol-disulfonate, and others. It should be noted that the moisture resistance of the polymerization toner will be lower when a hydrophilic organic stabilizer or surfactant is used.

As a monomer readily soluble in water simultaneously causes emulsion polymerization to contaminate the resultant suspension polymerizate (toner particles) with finer emulsion polymer particles, it is effective to add a water-soluble polymerization inhibitor such as a metal salt to prevent the emulsion polymerization in the aqueous phase. Further, it is possible to add glycerine or glycol into the aqueous medium in order to prevent the coalescence of the particles during polymerization by increasing the viscosity of the aqueous medium. It is also possible to add a salt such as NaCl, KCl or $Na_2SO_4$ in order to decrease the solubility of a readily water-soluble monomer in water. It is also possible to add a Broensted acid such as hydrochloric acid in order to enhance the ionization of the polar group of the polar polymer or cyclized rubber in the monomer composition. Particularly, the addition of a Broensted acid such as hydrochloric acid in the aqueous medium is effective in enhancing the effect of an anionic polymer (including copolymer) or cyclized rubber.

The polymerization toner according to the present invention is applicable to the known dry system methods for developing electrostatic images including the two-component developing methods such as the cascade method, the magnetic brush method and the microtoning method; the one-component developing methods using a magnetic toner such as the electroconductor one-component developing method, the insulating one-component developing method and the jumping developing method; the powder cloud method and the fur brush method; the nonmagnetic one-component developing method wherein the toner is carried on a toner-carrying member to be conveyed to a developing position and subjected to development thereat; and the electric field curtain method wherein the developer is conveyed by an electric field curtain to a developing position and subjected to development thereat. Thus, the polymerization toner of the present invention is especially suitably applicable to the dry system developing methods but can also be applicable to the wet system developing method in some cases.

Hereinbelow, the present invention will be described based on examples wherein "parts" denote wt. parts (parts by weight) unless otherwise noted specifically.

EXAMPLE 1

| | |
|---|---|
| Styrene monomer | 2000 parts |
| Cyclized rubber (Albex CK450, mfd. by Hoechst Japan K.K.) | 400 parts |
| Bontron E 81 (charge controller, mfd. by Orient Kagaku | 80 parts |

-continued

| | |
|---|---|
| Kogyo K.K.) | |
| Carbon black | 600 parts |
| (STERING R, mfd. by Cabot Co., U.S.A.) | |
| Paraffin Wax 155° F. | 4000 parts |
| (Softening point (S.P.) = 69° C.) | |

The above ingredients were mixed at 80° C. for 4 hours by means of an attritor to prepare a monomer composition.

The thus obtained monomer composition in an amount of 254 parts was charged in an aqueous medium comprising 1200 parts of distilled water containing 20 parts of amino-modified silica (obtained by treating 100 parts by Aerosil 200 with 5 parts of aminopropyltriethoxysilane) and 25 parts of 0.1 N-hydrochloric acid and heated to 85° C. under stirring by means of a TK homomixer, and stirred at 10,000 rpm for 15 minutes to form particles through dispersion.

After the particle formation, the liquid temperature was lowered to 60° C., and 3 parts of 2,2'-azobis-(2,4-dimethylvaleronitrile) and 1.5 parts of 2,2'-azobisisobutyronitrile as a polymerization initiator were added to the aqueous medium, followed by stirring for 30 minutes. Further, the stirrer was replaced by a paddle blade stirrer and stirring was conducted at 60° C. for 10 hours to complete the polymerization.

The aqueous medium containing the thus obtained polymerization toner was cooled; and the toner was dehydrated, washed with a sodium hydroxide solution to remove the amino-modified silica, washed with water, dehydrated and dried (followed by classification, as desired, to remove unnecessary finer particles portion) to obtain a polymerization toner having a volume-average particle size of 6.5 μm (as measured by using a Coulter counter with a 100 μm-aperture). The thus obtained toner did not cause any blocking even when placed in an environment of 50° C. for 1 day.

10 parts of the above toner, 0.1 part of zinc stearate powder, 0.1 part of hydrophobic silica (Aerosil R972, Nihon Aerosil K.K.), and 90 parts of carrier particles composed of magnetite and epoxy resin and having an average particle size of 40 μm, were mixed to prepare a developer, which was then used for development under the following conditions.

A developing apparatus as shown in the figure was used. An image-bearing member 1 has a selenium photosensitive member 12, which was rotated at a peripheral speed of 100 mm/sec, the maximum potential of an electrostatic image formed on the image bearing member was +750 V. Opposite the image-bearing member 1 was disposed a sleeve 2 having an outer diameter of 20 mm and rotated at a peripheral speed of 100 mm/sec. A magnetic flux of 1000 Gauss was exerted to the surface of the sleeve 2 with a magnet roller 3 having poles of $N_1$, $N_2$, $S_1$ and $S_2$. Thus, a layer of the developer in a thickness of 200 μm was formed. The sleeve 2 and the image bearing member 1 were disposed at gap of 300 μm. The bias voltage applied to the sleeve comprised a DC component of +200 V, and an AC component of 3.0 KHz and 1400 Vpp. The electrostatic image was satisfactorily developed. The developed toner image was electrostatically transferred to plain paper, and fixed by passing through a hot roller fixing apparatus (nip width: 7 mm, paper moving speed of 150 mm/sec) under a pressure of 10 Kg/cm² and at a fixing temperature of 100° C.

More specifically, in the developing apparatus shown in the figure, a toner T mixed with an external additive was quantitatively supplied to a lower chamber by means of an elastic member 7 and a supply roller 8, and mixed with a carrier to form a developer 4. To the sleeve 2 having a magnet roller 3 therein and a doctor blade 10, a DC bias was supplied from a DC bias supply 5, and an AC bias was supplied from an AC bias supply. As the rotation of the sleeve 2 in the direction of A, the developer 4 was conveyed and supplied for development of an electrostatic latent image on the image-bearing member 1 comprising the aluminum cylinder 11 and the selenium photosensitive member 12. A developer regulating member 9 also functioned as an outer wall of the developing apparatus.

EXAMPLE 2

A polymerization toner was prepared in the same manner as in Example 1 except that 4000 parts of Paraffin wax 155° F. was replaced by 2000 parts of carnauba wax (S.P. 84° C.) and 2000 parts of Paraffin wax 155° F. (S.P. 69° C.), and the temperature of the aqueous medium at the time of dispersion and particle formation was changed to 90° C. A toner image formed on plain paper in the same manner as in Example 1 was fixed at 100° C. by means of the same fixing apparatus as used in Example 1, whereby fixing was effected satisfactorily.

EXPERIMENT EXAMPLE 1

The polymerization initiator was preliminarily dissolved in the monomer composition and subjected to dispersion and particle formation at 85° C. as in Example 1, whereby the polymerization initiator was rapidly decomposed. As a result, the polymerization was insufficient and large amounts of non-reacted styrene and oligomers resulted, thus failing to provide a good polymerization toner.

EXPERIMENT EXAMPLE 2

Example 1 was repeated except that the temperature of the aqueous medium at the time of dispersion and particle formation was changed to 60° C., whereby only a polymerization toner having a very wide particle size distribution with coarse particles of 100 μm or larger was obtained.

EXAMPLE 3

| | |
|---|---|
| Styrene monomer | 1700 parts |
| 2-Ethylhexylmethacrylate | 300 parts |
| Cyclized rubber (Albex CK 450) | 200 parts |
| Bontron E 81 | 40 parts |
| Carbon black (Setring R) | 200 parts |

The above ingredients were mixed for 4 hours by an attritor to form a monomer composition. Separately, an aqueous medium comprising 20 parts of amino-modified silica, 25 parts of 0.1N-hydrochloric acid and 1200 parts of distilled water was heated at 75° C., and 244 parts of the above monomer composition was added to the aqueous medium under stirring by TK homomixer. After the addition, stirring was effected for 30 minutes at 10,000 rpm to effect dispersion and particle formation, followed by cooling to 60° C. A mixture polymerization initiator comprising 8 parts of 2,2'-azobis-(2,4-dimethylvaleronitrile) and 4 parts of 2,2'-azobisisobutyronitrile was added to the aqueous medium, followed by 30 minutes of stirring. After that stirring was continued by an ordinary stirrer rotating at 100 rpm to effect the polymerization at 60° C. for 10 hours. Then, the post treatments were conducted as in Example 1 to obtain a polymerization toner having a volume-average particle size of 4.6 μm with a sharp particle size distribution. The thus obtained polymerization toner contained particles of 10 μm or larger in an amount of only about 2.0% or below.

The polymer produced from styrene and 2-ethylhexyl methacrylate contained in the polymerization toner showed a weight-average molecular weight (Mw) of 23,039 and a number-average molecular weight (Mn) of 10,633 as polystyrene according to measurement by gel permeation chromatography (apparatus: Waters 150C, column A-80M).

EXPERIMENT EXAMPLE 3

A polymerization toner was prepared in the same manner as in Example 3 except that the polymerization initiator was dissolved in the monomer composition in advance, the dispersion for particle formation was conducted at 60° C., and then polymerization was successively conducted at 60° C.

The prepared polymerization toner had an average particle size of 6.5 μm, but showed a wider particle size distribution than in Example 3. The polymerization toner contained about 12 wt. % of particles with sizes of 10 μm or larger. The polymer in the toner showed Mw of 23747 and Mn of 10721. This means that the polymerization was similarly proceeded.

EXAMPLE 4

| | |
|---|---|
| Styrene monomer | 2000 parts |
| Cyclized rubber | 400 parts |
| (Albex CK450, mfd. by Hoechst Japan K.K.) | |
| Bontron E81 | 80 parts |
| (charge controller, mfd. by Orient Kagaku Kogyo K.K.) | |
| Carbon black | 600 parts |
| (STERING R, mfd. by Cabot Co., U.S.A.) | |
| Paraffin Wax 155° F. | 3500 parts |
| (Softening point (S.P. = 69° C.) | |

The above ingredients were mixed at 80° C. for 4 hours by means of an attritor to prepare a monomer composition.

The thus obtained monomer composition in an amount of 254 parts was charged in an aqueous medium comprising 1200 parts of distilled water containing 20 parts of amino-modified silica as used in Example 1 and 25 parts of 0.1N-hydrochloric acid and heated to 85° C. under stirring by means of a TK homomixer, and stirred at 10,000 rpm for 15 minutes to form particles through dispersion.

After the particle formation, the liquid temperature was lowered to 60° C., and 3 parts of 2,2'-azobis-(2,4-dimethylvaleronitrile) and 1.5 parts of 2,2'-azobisisobutyronitrile as a polymerization initiator were added to the aqueous medium, followed by stirring for 30 minutes. Further, stirrer was replaced by a paddle blade stirrer and stirring was conducted at 60° C. for 10 hours to complete the polymerization.

The aqueous medium containing the thus obtained polymerization toner was cooled; and the toner was dehydrated, washed with a sodium hydroxide solution to remove the amino-modified silica, washed with water, dehydrated and dried (followed by classification, as desired, to remove unnecessary finer particle portion) to obtain a polymerization toner having a volume-average particle size of about 6.5 μm (as measured by using a Coulter counter with a 100 μm-aperture). The thus obtained toner contained about 180 parts of the paraffin wax per 100 parts of polystyrene. The toner did not cause any blocking even when placed in an environment of 50° C. for 1 day. From this, it is known that the paraffin wax was enveloped in the interior of the polymerization toner particles.

10 parts of the above toner, 0.1 part of zinc stearate powder, 0.1 part of hydrophobic silica (Aerosil R 972, Nihon Aerosil K.K.), and 90 parts of insulating carrier particles composed of 75 parts of magnetite and 25 parts of epoxy resin and having an average particle size of 40 μm, were mixed to prepare a developer, which was then used for development under the same conditions as in Example 1.

An electrostatic image was satisfactorily developed. The developed toner image was electrostatically transferred to plain paper, and satisfactorily fixed by passing through a hot roller fixing apparatus (nip width: 7 mm, paper moving speed of 150 mm/sec) under a pressure of 10 Kg/cm² and at a fixing temperature (roller surface temperature) of 100° C.

EXAMPLE 5

A polymerization toner was prepared in the same manner as in Example 4 except that 3500 parts of Paraffin Wax 155° F. was replaced by 500 parts of Paraffin Wax 140° F. (S.P. 60° C.) and 2000 parts of Paraffin Wax 155° F. (S.P. 69° C.), and the temperature of the aqueous medium at the time of dispersion and particle formation was changed to 90° C. The obtained toner showed a volume-average particle size of 5.8μ and contained about 125 parts of the paraffin wax per 100 parts of the polystyrene. A toner image formed on plain paper in the same manner as in Example 4 was fixed at 130° C. by means of the same fixing apparatus as used in Example 4, whereby fixing was effected satisfactorily.

EXAMPLE 6

| | |
|---|---|
| Styrene monomer | 1700 parts |
| 2-Ethylhexylmethacrylate | 300 parts |
| Cyclized rubber (Albex CK450) | 400 parts |
| Bontron E 81 | 80 parts |
| Carbon black (Setring R) | 300 parts |
| Hard paraffin wax | 1100 parts |
| (HNP10, mfd. by Nihon Seiro K.K., S.P.: 75° C.) | |

The above ingredients were mixed for 4 hours by an attritor to form a monomer composition. Separately, an aqueous medium comprising 20 parts of amino-modified silica, 25 parts of 0.1N-hydrochloric acid and 1200 parts of distilled water was heated at 75° C., and 254 parts of the above monomer composition was added to the aqueous medium under stirring by TK homomixer. After the addition, stirring was effected for 30 minutes at 10,000 rpm to effect dispersion and particle formation, followed by cooling to 60° C. A mixture polymerization initiator comprising 5 parts of 2,2'-azobis-(2,4-dimethylvaleronitrile) and 2 parts of 2,2'-azobisisobutyronitrile was added to the aqueous medium followed by 30 minutes of stirring. After that stirring was continued by an ordinary stirrer rotating at 100 rpm to effect the polymerization at 60° C. for 10 hours. Then, the post treatments were conducted as in Example 1 to obtain a polymerization toner having a volume-average particle size of 5.5 μm with a sharp particle size distribution. The thus obtained polymerization toner contained about 55 parts of the paraffin wax per 100 parts of polystyrene.

A toner image formed on plain paper in the same manner as in Example 4 was fixed at a roller surface temperature of 140° C., whereby fixing was effected satisfactorily.

COMPARATIVE EXAMPLE 1

| | |
|---|---|
| Styrene monomer | 2000 parts |
| Cyclized rubber | 400 parts |
| (Albex CK450, mfd. by Hoechst Japan K.K.) | |
| Bontron E 81 | 80 parts |
| (charge controller, mfd. by Orient Kagaku Kogyo K.K.) | |
| Carbon black | 300 parts |
| (STERING R, mfd. by Cabot Co., U.S.A.) | |
| Paraffin Wax 140° F. (S.P.: 60° C.) | 400 parts |

The above ingredients were mixed at 60° C. for 4 hours by means of an attritor to prepare a monomer composition.

The thus obtained monomer composition in an amount of 254 parts was further mixed with 6 parts of 2,2'-azobis-(2,4-dimethylvaleronitrile) and 3 parts of 2,2'-azobis-isobutyronitrile, and was dispersed in an aqueous medium comprising 1200 parts of distilled water containing 20 parts of amino-modified silica as used in Example 1 and 25 parts of 0.1N-hydrochloric acid and heated to 60° C. under stirring by means of a TK homomixer, and stirred at 10,000 rpm for 15 minutes to form particles through dispersion.

Further, the stirrer was replaced by a paddle blade stirrer, and stirring was continued at 60° C. for 10 hours to complete the polymerization. Then, the post treatments were conducted as in Example 4 to obtain a polymerization toner having a volume-average particle size of 5.3 μm. The obtained toner contained about 20 parts of the paraffin wax per 100 parts of polystyrene. The toner in an amount of 10 parts, 0.1 part of zinc stearate powder, 0.1 part of hydrophobic silica (Aerosil R 972, Nihon Aerosil K.K.), and 90 parts of insulating carrier particles (same as those used in Example 4), were mixed to prepare a developer. The developer was subjected to development, transfer and fixing as in Example 4, whereby a practically acceptable fixed image was obtained at a fixing temperature of 190° C. or higher. However, in any of the cases wherein the fixing temperatures were 100° C., 120° C. and 140° C., respectively, fixing was insufficient and failed to provide a practically acceptable fixed image.

COMPARATIVE EXAMPLE 2

| | |
|---|---|
| Styrene monomer | 2000 parts |
| Cyclized rubber | 400 parts |
| (Albex CK450, mfd. by Hoechst Japan K.K.) | |
| Bontron E 81 | 80 parts |
| (charge controller, mfd. by Orient Kagaku Kogyo K.K.) | |
| Carbon black | 600 parts |
| (STERING R, mfd. by Cabot Co., U.S.A.) | |
| Paraffin Wax 140° F. (S.P.: 60° C.) | 70000 parts |

The above ingredients were mixed at 60° C. for 4 hours by means of an attritor to prepare a monomer composition.

The thus of obtained monomer composition in an amount of 254 parts was further mixed with 6 parts of 2,2'-azobis-(2,4-dimethylvaleronitrile) and 3 parts of 2,2'-azobis-isobutyronitrile, and was dispersed in an aqueous medium comprising 1200 parts of distilled water containing 20 parts of amino-modified silica as used in Example 1 and 25 parts of 0.1N-hydrochloric acid and heated to 60° C. under stirring by means of a TK homomixer, and stirred at 10,000 rpm for 15 minutes to form particles through dispersion.

Further, the stirrer was replaced by a paddle blade stirrer, and stirring was continued at 60° C. for 10 hours to complete the polymerization. Then, the post treatments were conducted as in Example 4, whereas the produced particles contained a large number of particles having sizes of over 100 μm and could not be applied to a practical use as a toner for developing electrostatic images as they were. For this reason, classification was conducted to provide particles with a volume-average particle size of about 10 μm. The particle, however, were insufficient in anti-blocking characteristic.

As described hereinabove, the polymerization toner according to the present invention is capable of providing good images through fixation at a low pressure and/or a low temperature because it contains a large quantity of a low-softening point compound. As the toner has a unique pseudo capsule structure, it is excellent in anti-blocking characteristic and in fluidity in spite of the fact that it contains a large amount of a low-softening point compound.

What is claimed is:

1. A process for producing a toner, comprising the steps of:
    dispersing a monomer composition comprising 100 wt. parts of a polymerizable monomer, from 50-3000 wt. parts of a low-softening point compound and a colorant in an aqueous medium heated to a temperature which is higher than a polymerization temperature adapted for providing the polymerization of the polymerizable monomer so as to form particles of the monomer composition;
    lowering the temperature of the aqueous medium to the polymerization temperature; and
    adding 0.1–20 wt. parts of a substantially water-insoluble polymerization initiator per 100 wt. parts of the polymerizable monomer to the aqueous medium containing the particles of the monomer composition dispersed therein which is adjusted to the polymerization temperature in order to polymerize the polymerizable monomer.

2. A process according to claim 1, wherein said polymerization initiator is melted in the aqueous medium at the polymerization temperature.

3. A process according to claim 1, wherein the polymerization initiator is used in an amount of 1–10 wt. parts per 100 wt. parts of the polymerizable monomer.

4. A process according to claim 1, wherein the polymerization initiator is a mixture of two or more species thereof.

5. A process according to claim 1, wherein the monomer composition is formed into particles in the aqueous medium at a temperature of 50° C. or higher.

6. A process according to claim 6, wherein the monomer composition is formed into particles in the aqueous medium at a temperature of 75° C. or higher.

7. A process according to claim 1, wherein the suspension polymerization is effected in the aqueous medium at a temperature of 55°–80° C.

8. A process according to claim 1, wherein the suspension polymerization is effected for 2-30 hours.

9. A process according to claim 1, wherein the aqueous medium contains a dispersant.

10. A process according to claim 9, wherein the dispersant comprises substantially water-insoluble inorganic powder.

11. A process according to claim 10, wherein the dispersant is contained in an amount of 0.1-50 wt.% based on the water constituting the aqueous medium.

12. A process according to claim 11, wherein the dispersant is contained in an amount of 1-20 wt.%.

13. A process according to claim 1, wherein said monomer composition contains a polar polymer or a cyclized rubber.

14. A process according to claim 1, wherein said monomer composition contains a polar polymer or a cyclized rubber, and the aqueous medium contains a substantially water-insoluble inorganic powder having a chargeability to a polarity opposite to that of the polar polymer or cyclized rubber.

15. A process according to claim 1, wherein said aqueous medium comprises 200-3000 wt. parts of water per 100 wt. parts of the polymerizable monomer.

16. A process according to claim 1, wherein said monomer composition is formed into particles in the aqueous medium having a temperature which is 5° C. or more higher than the polymerization temperature.

17. A process according to claim 16, wherein said monomer composition is formed into particles in the aqueous medium having a temperature which is 10°-30° C. higher than the polymerization temperature.

18. A process according to claim 1, wherein 70-1000 wt. parts of the low-softening point compound is used per 100 wt. parts of the polymerizable monomer.

19. A process according to claim 18, wherein 100-1000 wt. parts of the low-softening point compound is used per 100 wt. parts of the polymerizable monomer.

20. A process according to claim 1, wherein said low-softening point compound has a softening point of 50°-120° C.

21. A process according to claim 1, wherein said low-softening point compound is a compound selected from the group consisting a paraffins, waxes, low-molecular weight polyolefins, modified waxes having aromatic group, natural waxes, carboxylic acids having a $C_{12+}$ hydrocarbon chain and esters thereof.

22. A process according to claim 1, wherein the temperature of the aqueous medium in which said monomer composition is formed into particles is higher than the softening point of the low-softening point compound.

* * * * *

UNITED STATES PATENT AND TRADEMARK OFFICE
CERTIFICATE OF CORRECTION

PATENT NO. : 4,789,617

DATED : December 6, 1988

INVENTOR(S) : KOZO ARAHARA, ET AL.   Page 1 of 2

It is certified that error appears in the above-identified patent and that said Letters Patent is hereby corrected as shown below:

AT [56] REFERENCES CITED

U.S. Patent Documents, "Denschel et al." should read --Deuschel et al.--.

U.S. Patent Documents, "4,656,113 9/1987" Ohshima et al." should read --4,656,113 4/1987 Ohshima et al.--.

COLUMN 6

Lines 58-59, "$\frac{W1T1+W2T2+...+Wn-1Tn-1+WnTn}{(W1+W2+...+Wn-1+Wn)^2}$ ‹.8,"
should read
--$\frac{W_1T_1+W_2T_2+...+W_{n-1}T_{n-1}+W_nT_n}{(W_1+W_2+...+W_{n-1}+W_n)^2}$ ‹.8,--.

Line 63, "(T1, W1), (T2, W2),...(T$_n$-1," should read --(T$_1$, W$_1$), (T$_2$, W$_2$),...(T$_n$-$_1$,--.

Line 64, "Wn-1), (Tn, Wn)." should read --(W$_n$-$_1$), (T$_n$, W$_n$)--.

COLUMN 7

Line 4, "50≦W1+W2+...Wn-1+Wn≦3000." should read --50≦W$_1$+W$_2$+...W$_n$-$_1$+W$_n$≦3000.--.

Line 12, "between" should read --below--.

COLUMN 18

Line 63, "6," should read --5,--.

UNITED STATES PATENT AND TRADEMARK OFFICE
CERTIFICATE OF CORRECTION

PATENT NO. : 4,789,617

DATED : December 6, 1988

INVENTOR(S) : KOZO ARAHARA, ET AL.

It is certified that error appears in the above-identified patent and that said Letters Patent is hereby corrected as shown below:

COLUMN 20

Line 19, "consisting a" should read --consisting of--.

Signed and Sealed this

Twenty-ninth Day of August, 1989

Attest:

DONALD J. QUIGG

Attesting Officer

Commissioner of Patents and Trademarks